United States Patent Office 3,839,451
Patented Oct. 1, 1974

3,839,451
N'-ALKYL AND N'-ARYL-N-FLUORENYL-p-PHENYLENEDIAMINES
Jerry Donald Hunt, Cuyahoga Falls, Ohio, assignor to The Firestone Tire & Rubber Company, Akron, Ohio
No Drawing. Original application May 22, 1969, Ser. No. 827,059, now Patent No. 3,625,913. Divided and this application Mar. 25, 1971, Ser. No. 128,121
Int. Cl. C07c 87/64
U.S. Cl. 260—576     3 Claims

ABSTRACT OF THE DISCLOSURE

N-fluorenyl-N'-alkyl and aryl-p-phenylenediamines are new compounds. They are antiozonants in natural and synthetic diene rubbers.

---

This application is a division of my application Ser. No. 827,059, filed May 22, 1969 now 3,625,913.

N-fluorenyl-N'-alkyl and aryl-p-phenylenediamines are new. They act as antiozonants when added to natural and synthetic diene rubbers.

The alkyl groups of the N-fluorenyl-alkyl-p-phenylenediamines include saturated hydrocarbons of 1 to 20 carbon atoms, including, for instance, methyl, ethyl, propyls, butyls, pentyls, octyls, decyls, dodecyls, stearyl, etc. as well as cyclobutyl, cyclohexyl, cyclooctyl, etc. The alkyl derivatives include also nitrogen- and oxygen-containing heterocyclic groups as, for example, morpholinyl, piperidinyl, pyrrodinyl, hexamethyleneiminyl, 2,6-dimethylmorpholinyl, etc. They include also the hydroxy and alkoxyl derivatives of alkyl groups of 1 to 20 carbon atoms in which the alkyl of the alkoxy groups contain 1 to 4 carbon atoms. The hydroxy and alkoxy groups may be attached to any carbon of the alkyl group and include, for example, hydroxymethyl, methoxymethyl, 1-hydroxylbutyl, 2-pentoxyoctyl, 9-hydroxydecyl, etc.

The aryl groups of the N-fluorenyl-aryl-p-phenylenediamines include, for example, phenyl, naphthyl, tolyl, propylphenyl, butylphenyl, xylyl, benzyl, phenethyl, biphenyl, alpha and beta ethyl naphthyl, o-, m- and p-methyl biphenyl, fluorenyl, indanyl and other benzenoids and hydroxy and alkoxy derivatives thereof in which the alkoxy groups include 1 to 4 carbon atoms and the hydroxy and alkoxy groups may be attached at any position on the ring or in the side chain as alpha or beta hydroxyethylphenyl, etc. The term "benzenoid" is used herein to include benzene and fused benzenoid rings which may be joined directly or indirectly and may include side chains.

The rubbers that are stabilized include natural rubber and synthetic diene rubbers including polybutadiene, polyisoprene, butadiene-styrene copolymer, butadiene-isoprene copolymer, etc.

The antiozonants are added in any usual amount, such as, for example, 0.5 to 10 percent of the weight of the rubber and preferably from 1 to 5 percent.

The following examples are illustrative.

EXAMPLE I

N-fluorenyl-N'-phenyl-para-phenylenediamine

The preparation is illustrated by the following equation:

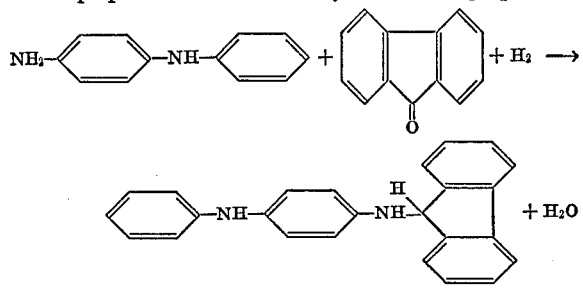

The following materials were added to a Parr shaker apparatus:

27.6 g. (0.15 mole) p-aminodiphenylamine
27.0 g. (0.15 mole) 9-fluorenone
1.5 ml. glacial acetic acid
0.15 g. PtO₂ (Adam's catalyst)
100 ml. absolute ethanol The acetic acid and platinum oxide serve as catalyst and the ethanol serves merely as a solvent. The apparatus was placed under 50 p.s.i. (pounds per square inch) of hydrogen. After 18 hours the theoretical amount of hydrogen (0.15 mole) had reacted and the reaction was stopped. The catalyst was filtered and solvent was evaporated, leaving the N-fluorenyl-N'-phenyl-paraphenylenediamine. The melting point was 87–91° C. IR (infra-red) and NMR (Nuclear Magnetic Resonance) determinations verified the structure of the product.

EXAMPLE II

N-fluorenyl-N'-isopropyl para-phenylenediamine

The preparation is illustrated by the following equation:

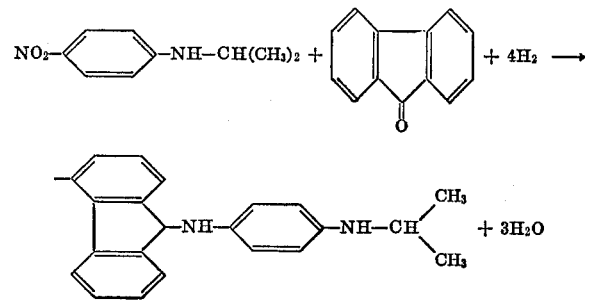

The following materials were added to a Parr shaker apparatus:

27.0 g. (0.15 mole) N-isopropyl-p-nitro-aniline
27.0 g. (0.15 mole) 9-fluorenone
0.2 g. PtO₂ (Adam's catalyst)
2.5 ml. glacial acetic acid
100 ml. absolute ethanol The vessel was placed under 50 p.s.i. of hydrogen. After 0.6 mole of hydrogen had reacted (3.5 hours) the reaction was stopped, the catalyst filtered, and the solvent evaporated. The resulting product is N-fluorenyl-N'-isopropyl para-phenylenediamine. Melting point 85–87° C. The IR and NMR spectra verified the structure of the compound.

The fluorenyl derivatives of this invention can be used as antiozonants in diene rubbers. The following examples are illustrative of their use in oil-extended tire sidewall stocks, but it is to be understood that other fluorenyl derivatives included generally herein may be similarly utilized as antiozonants and any of the fluorenyl derivatives of the invention may be used as antiozonants in other rubber compounds, including tread stocks, hose, motor mounts, conveyor belts, etc.

The antiozonants of this invention may be used alone or in combination with other antiozonants and with antioxidants. The rubber stocks may include other reinforcing agents than carbon blacks as, for example, silica, but it is not necessary that a reinforcing agent be included.

ANTIOZONANT EVALUTIONS OF THE EXPERIMENTAL COMPOUNDS

The two antiozonants of Examples I and II were compounded in a general formula and a commercial antiozonant Santoflex 77 (N,N'-di-secondary heptyl paraphenylenediamine) was similarly compounded, and the different stocks were tested against a blank containing no antiozonant. The formula used is set forth in the following table. The formula need not include any reclaim but may include as much as 22.5 percent of reclaim.

| Stock | A | B | C | D | E |
|---|---|---|---|---|---|
| SBR | 121.0 | 121.0 | 121.0 | 121.0 | 121.0 |
| Reclaim* | 28.0 | 28.0 | 28.0 | 28.0 | 28.0 |
| Black | 68.0 | 68.0 | 68.0 | 68.0 | 68.0 |
| Zinc oxide | 2.0 | 2.0 | 2.0 | 2.0 | 2.0 |
| Stearic acid | 0.5 | 0.5 | 0.5 | 0.5 | 0.5 |
| Processing oil | 11.0 | 11.0 | 11.0 | 11.0 | 11.0 |
| Sulfur | 2.0 | 2.0 | 2.0 | 2.0 | 2.0 |
| Accelerator | 1.2 | 1.2 | 1.2 | 1.2 | 1.2 |
| Wax | 5.0 | 5.0 | 5.0 | 5.0 | 5.0 |
| Antiozonant: | | | | | |
| Example I | 2.5 | | 1.4 | | |
| Example II | | 2.5 | | 1.4 | |
| Santoflex 77 | | | 1.4 | 1.4 | |

*The reclaim was a standard grade of reclaim rubber.

The various stocks were cured at 300° F. The physical properties are given for 23-minute cures and the ozone evaluations were made on the same stocks by treatment in an ozone chamber using 60 p.p.h.m. of ozone. (Except for said larger amount of ozone, the test was ASTM test D-1149-64.) Two ozone test were conducted; one for 7 hours at 40° F., and the other for 14 hours at 95° F.

| | Stress-strain properties | | | | |
|---|---|---|---|---|---|
| | A | B | C | D | E |
| 300% modulus, p.s.i | 775 | 775 | 700 | 725 | 700 |
| 400% modulus, p.s.i | 1,050 | 1,075 | 1,025 | 1,100 | 1,075 |
| Tensile strength | 1,475 | 1,525 | 1,425 | 1,600 | 1,375 |
| Ultimate elongation, percent | 530 | 520 | 540 | 560 | 460 |
| | Ozone evaluation | | | | |
| 7 hours at 40° F | (1) | (1) | (1) | (2) | Broke |
| 14 hours at 95° F | (3) | (1) | (1) | (3) | Broke |

[1] Moderate.
[2] Very, very slight.
[3] Slight.

I claim:
1. N-fluorenyl-N'-substituted paraphenylenediamine in which the N'-substituent is selected from the group consisting of phenyl, naphthyl, tolyl, xylyl, and alkyl containing 1 to 20 carbon atoms and alkyl containing 1 to 20 carbon atoms which is substituted by a substituent selected from the group consisting of hydroxy and alkoxy in which the alkoxy group contains 1 to 4 carbon atoms.
2. N-fluorenyl-N'-phenyl-paraphenylenediamine.
3. N-fluorenyl-N'-isopropyl-paraphenylenediamine.

References Cited

UNITED STATES PATENTS 3,507,826   4/1970   Lal et al. _____ 260—45.9
2,691,642   10/1954  Faulkner _____ 260—45.9 R LORRAINE A. WEINBERGER, Primary Examiner C. F. WARREN, Assistant Examiner U.S. Cl. X.R.

260—239 B, 247.5 R, 293.62, 326.85, 570.5 P, 571, 573